United States Patent [19]
Lai

[11] 4,283,138
[45] Aug. 11, 1981

[54] LOW-FLYING OBJECT VELOCITY-POSITION TRACING SYSTEM

[76] Inventor: So S. Lai, 16th Floor, Flat C, Brilliant Ct., 27 Chai Wan Rd., Hong Kong, Hong Kong

[21] Appl. No.: 72,920

[22] Filed: Sep. 6, 1979

[51] Int. Cl.³ .......................... G01P 3/36; G08B 13/18
[52] U.S. Cl. ....................................... 356/28; 340/555; 340/556; 340/557
[58] Field of Search .................. 356/28; 340/555, 556, 340/557

[56] References Cited
U.S. PATENT DOCUMENTS

| | | | |
|---|---|---|---|
| 2,769,492 | 11/1956 | Ostergren et al. | 356/28 |
| 3,036,219 | 5/1962 | Thompson | 343/5 PD |
| 3,641,549 | 2/1972 | Misek et al. | 340/557 |
| 3,987,428 | 10/1976 | Todeschini | 340/557 |

Primary Examiner—S. C. Buczinski

[57] ABSTRACT

The invention is a simple but efficient position and velocity identifying system to low-flying objects especially cruising missiles. Through a system of prism-complexes, the beams lased by four lasers (preferably injection lasers) are split into systems of orthogonally intersecting beam-quadruplets in parallel lying on the horizontal plane, each of which impinges a light-sensor-quadruplet. The curved air equidensity surfaces around the wings or the shock waves generated by a low-flying object passing by deflect a beam-quadruplet, such that the sensors of a light-sensor-quadruplet switch sequentially. The transient between the switchings, converted into a count, together with the sensor-quadruplet-address generated in an associated electronic circuit, are transmitted via a common multiple to a console where the count is converted into velocity there.

1 Claim, 7 Drawing Figures

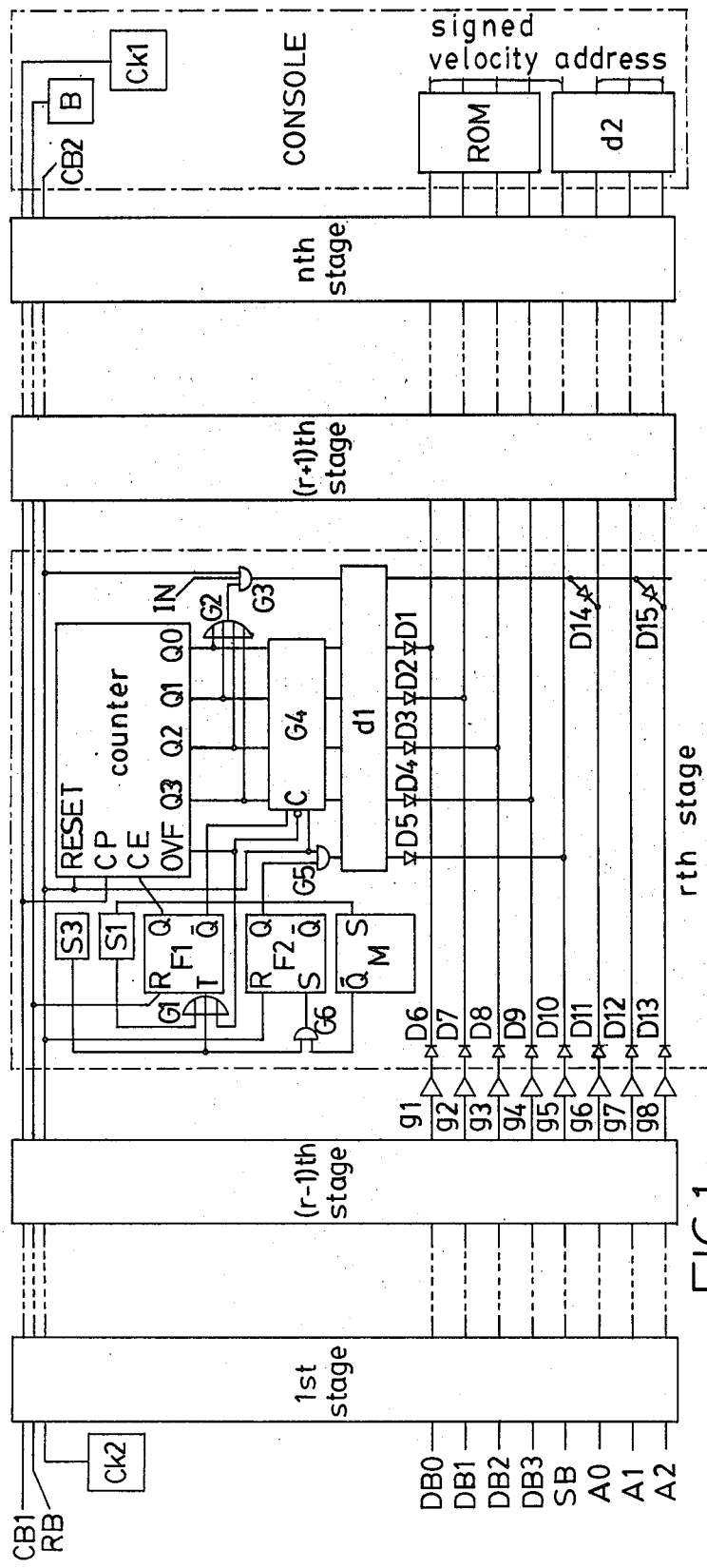
FIG 1
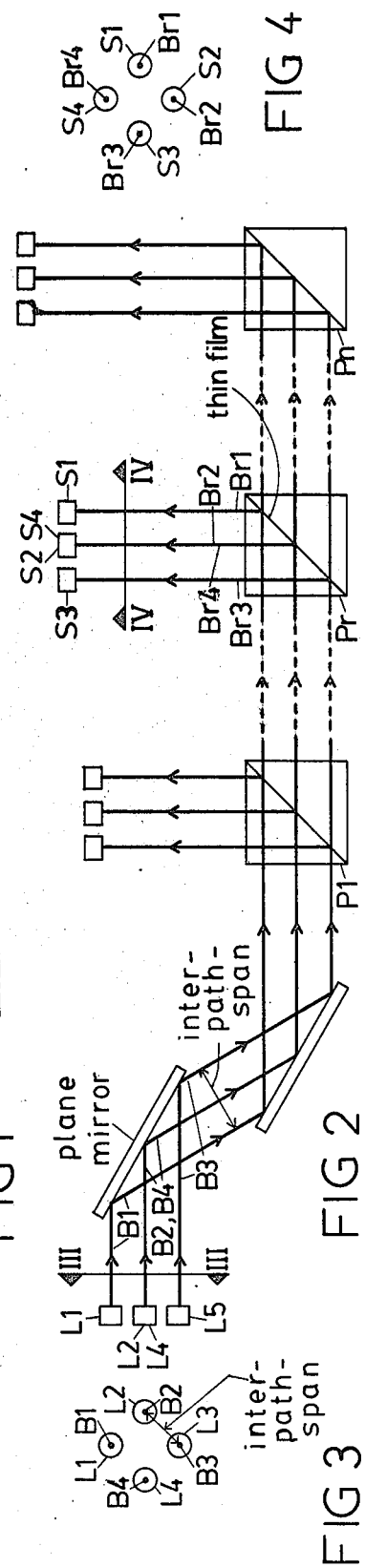
FIG 2
FIG 3
FIG 4

LOW-FLYING OBJECT VELOCITY-POSITION TRACING SYSTEM

SUMMARY (INCLUDING THE BACKGROUND)

The Low-Flying Object Velocity-Position Tracing System has been invented mainly for defense purpose. The invention is applicable for the detection of low-flying objects which cruise along valleys and coastal areas. In such areas, radars and laser detectors cannot perform their proper functions as the images of low-flying objects are masked by that of the mountains or sea waves. To solve this problem, the old method of detection by analyzing the reflected microwaves or laser beams from the flying objects is not used. Instead, the new method is: detection of the flying objects and the determination of their velocities facilitated by the sequential deflections of laser beam-quadruplets when they are intercepted by the curved equidensity surfaces of air resulting from the downwash and sidewashes around the wings of a flying object or the Mach cone surfaces of a high speed flying object.

To achieve this function one-dimensionally, a sequence of light sensors is arranged dual-in-line with a sequence of prism-complexes which are made by sticking together two right-angled-isosceles-prisms with a thin film of material having a refractive index which differs from that of the prisms. Parallel primary beams emitted by four lasers (preferably injection lasers with a common cooling system) are directed to penetrate the sequence of prism-complexes where small proportions of the primary beam flux are reflected to form parallel beam-quadruplets each of which impinges a light-sensor-quadruplet (preferably phototransistors).

The pattern of the lasers, sensors and the sections of both the primary and secondary beam-quadruplets when viewed along their longitudinal axis, cause the relevant elements become the vertices of an imaginary erect rhombus. The pair lying horizontally and the pair lying vertically are respectively responsible for determining the horizontal and vertical velocity components.

Each of the sensor-quadruplets is connected to one electronic circuit (one stage of an electronic network) linked to other circuits and the console by multiple buses, by which a sign of the flying-object velocity is generated according to the order of being swept of either the horizontal or vertical sensor pair. The transient between when the sensors of either pair are swept is converted into a count (of clock pulses) also by this electronic circuit. The sign and count are transmitted via the sign and data buses respectively to a console where the count is converted into the corresponding velocity by a read-only-memory. The address (i.e. location) of the sensor-quadruplets is also generated by transferring a clock pulse (distributed among the electronic circuits via a clock bus) via appropriate diode-jumpering onto the address buses linking the electronic circuits and the console, so that the address also appear at the console.

A narrow duty cycle clock pulse train (of the above said clock pulse) when operated with suitable delay-element-groups can recurrently release the signs and counts (stored in the electronic circuit) from stage by stage of the electronic network to form parallel sequences of groups of ordered pulse sequences travelling along the multiple buses towards the console. Diodes are connected in series at proper positions of the buses to prevent the pulse groups to travel at an undesired direction.

A two-dimensional system can be built from two one-dimensional systems, so arranged that the laser beams of the two systems are orthogonally intersecting that of the other and both lie on the horizontal plane. This arrangement forms a non-substantial quasi-ceiling shielding the area below it.

A three-dimensional system can be formed by vertically cascading horizontal laser-beam planes and adding the appropriate electronic networks. This results in a nonsubstantial cubic matrix mesh.

BRIEF DESCRIPTION OF THE SEVERAL VIEWS OF THE DRAWINGS

1.
FIG. 1 is the logic circuit diagram of the electronic network.
2.
FIG. 2 is a plan of the arrangement of the optics system.
3.
FIG. 3 is a sectional view of the pattern of the primary laser beams. The positions of the lasers have also been shown.
4.
FIG. 4 is a sectional view of the pattern of one secondary laser beam-quadruplet. The positions of the light sensors have also been shown.
5.

DETAILED DESCRIPTION

The system is built from two main parts. The first part, an optics system, consists of four lasers (injection lasers are preferred) installed in a console, and, outside the console, two dual-in-line sequences of prism-complexes and light sensors. The second part, a distributed electronic network, consists of a sequence of identical electronic circuits, one assigned to each prism-complex, linked by appropriate coaxial line multiples via which signals, data and addresses (in binary) in the form of electrical pulsations (for simplicity hereinafter, just referred to as signals, data and addresses) and clock pulses are communicated between the console and the electronic circuits.

As shown in FIG. 2 a prism-complex (such as the prism-complex designated by the letters Pr) is made by sticking together the hypotenuse-planes of two right-angled-isosceles-prisms with a thin film (such as the one indicated for the prism-complex Pr) of material which refractive index differs from that of the prism material. The sequence of prism-complex, spaced 10 to 30 meters apart, are placed inside a piecewise straight rectangular hollow tube used as a laser beam shield.

Figure 6:
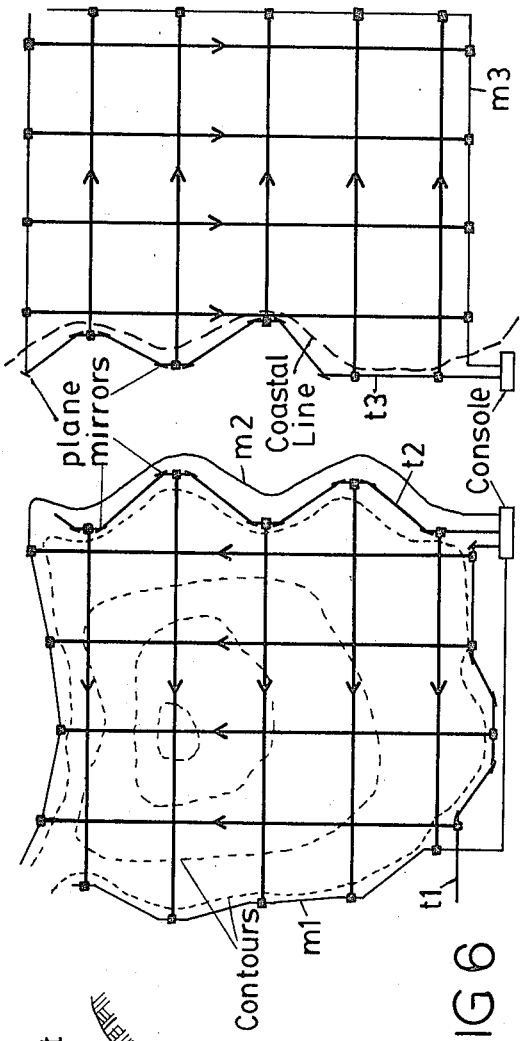
FIG. 6 is a plan of two two-dimensional laser beam meshes installed to cover a valley and a piece of coastal area. Positions of the rectangular tubes accommodating the sequences of prism-complexes and of the sensors and plane mirrors have also been shown.
7.

To use the system, the said tube is suggested to be installed along a high level contour of a mountain ridge. At positions neighbouring the prism-complexes on the tube wall, openings are provided to allow the laser beams in parallel bundles to pass through to reach the sequences of sensors installed along a contour at the same level as that for the tube on another mountain ridge. This is shown in FIG. 6 where laser beam-quadruplets are represented by thick arrowed-lines. Here two separate rectangular hollow tubes t1 and t2 and two separate multiples m1 and m2 are used for the according orthogonally intersecting laser beams.

Alternatively the tube is suggested to be installed on the tops (above sea level) of posts anchored at the sea bed, with the sensors on another dual-in-line set of tops of posts. Both sets of posts are installed along coastal lines. This is also shown in FIG. 6 but another organisation has been introduced, i.e. a common rectangular hollow tube t3 and a common multiple m3 are used.

Both organisations result in flat horizontal planes of equally spaced laser beam bundles, which are effectively non-substantial quasi-ceilings. The horizontal position of any object which tends to approach this quasi-ceiling can immediately be detected together with its velocity being determined. This is a static detecting system, and at any point lying within a thin region accommodating the quasi-ceiling continuous detection has been provided. Unlike other systems, no rotating and synchronising mechanisms are required.

Because the tube accommodating the prism-complexes are only piecewise straight, the primary laser beams (laser beams which are not generated by the reflections of the thin films of the prism-complexes) can propagate along a path quasi-matched to the profile of the contour. Change of direction of the primary beams can be achieved by the reflections of parallel plane mirror pairs (one of them has been shown and indicated in FIG. 2) so that the inter-pathspans (as those indicated in FIG. 2 and FIG. 3) and the beam sectional patterns are preserved.

For the simplicity of the following detailed description, hereinafter, an alphanumeric expression which appears immediately after a subject or an object, shall become the designation(s) of the symbol(s) representing that subject or object in relevant figures. Also the digit capacities of the counter and addresses etc. are reduced to small figures and, power supply buses are omitted in FIG. 1.

OPTICAL SWITCHING

As shown in FIG. 3 the lasers are arranged in such a pattern that they become the vertices of an imaginary erect rhombus. As shown in the plan of the optics system (FIG. 2) the laser beams B1, B2, B3 and B4 (about 0.1 mm in diameter) are directed to penetrate a sequence of prism-complexes P1, ..., Pr, ..., P(n-1). Upon penetrating each prism-complex, small proportions, say 0.1% of the four bundles of flux are extracted from the primary beams to form secondary beam-quadruplets due to the reflections of the diagonally lying thin films interlaid in the prism-complexes, till finally the beams B1, B2, B3 and B4 are totally reflected by the last prism-complex Pn. The proportionings of the reflected and transmitted flux of the beams of any prism-complex can be achieved by controlling the roughness and the thickness of the interlaid thin film (produced by, say, vacuum-metal-vapour-electrostatic-coating processes) or any other common available method which can vary the reflection coefficients of the diagonal interfaces.

Each one of these secondary beams impinges an assigned sensor. For example the beams Br1, Br2, Br3 and Br4 impinge the sensors S1, S2, S3 and S4 respectively. These sensors can be any type of light-to-electricity-transducer but phototransistors are preferably chosen here, and are arranged in an imaginary erect rhombus-shaped pattern as shown in FIG. 4.

Figure 5:
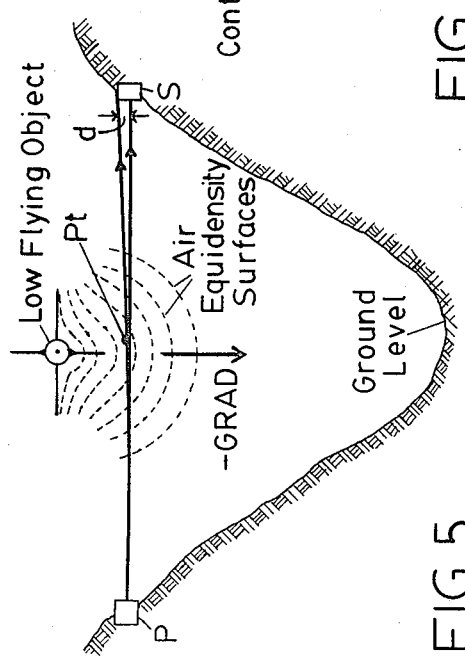
FIG. 5 shows the principle how a laser beam is deflected when a flying object approaches it.
6.

Whenever a low-flying object sweeps at, say, about 10 to 30 meters above or five to ten meters below the said nonsubstantial quasi-ceiling of beam-quadruplets, the curved equidensity surfaces of air (resulting from the downwash and sidewashes) below or above the wings, or, the Mach cone surfaces of the shock waves generated by objects flying at speeds above a critical speed, deflect the beam-quadruplets sequentially. The case where the flying object is above the quasi-ceiling (a more common case) is considered here in detail and the principle of how a beam is deflected is shown in FIG. 5, where the negative air density gradient is indicated by an arrow −GRAD. Here the beam emerged from the prism-complex P and normally impinging the light sensor S is deflected to incline to the centres of curvature of the equidensity surfaces of air as it passes through this region of spatially increasing refractive index. There are two subsequent cases. Firstly if the beam bends faster than the air equidensity surfaces (this case rarely occurs), the beam soon becomes normal to the surfaces, and thus penetrates straight through the remaining region and is finally reflected by the flying object, such that it cannot reach the sensor S. On the other hand, if the surfaces bends faster than the beam (as shown in FIG. 5) the beam soon becomes tangential to a point Pt, beyond which, the beam follows a quasi-symmetrical path about a normal to the air equidensity surfaces at point Pt. If the deflection d (vertical displacement at the sensor S) is sufficiently large (here more than 0.1 mm, i.e. diameter of a laser beam), the beam ceases to impinge the base-emitter junction of the phototransistor (i.e. the sensor S) and hence the normally-on sensor S is now offed. The order of switching of the sensors of a sensor-quadruplet depends on the directions of the vertical and horizontal components of the velocities.

The beam-quadruplets are deflected in a similar manner when the approaching flying object is below the quasi-ceiling. On the other hand, the beam-quadruplets passing through the very high pressure layer of a Mach cone will be deflected abruptly to unpredicted directions.

THE ELECTRONIC NETWORK

A detailed stage (logic circuits only), namely, the rth stage, of the electronic network is shown in FIG. 1. Consider any one pair of sensors lying on two opposite vertices of the above said rhombus pattern, such as the sensors S1 and S3. The collector-output of the sensor S1 is connected to a monostable multivibrator M which output $\overline{Q}$ is ANDed with the output of the sensor S3 by the AND gate G6. The output of the AND gate G6 is connected to the set-terminal S of a RS-flip-flop F2 which output Q is connected to an input of the AND gate G5. On the other hand, the outputs of the sensors S1 and S3, and the overflow-output OVF of the counter (labelled) is ORed by the OR gate G1, which output is connected to the trigger-terminal T of a T-flip-flop F1. The counter overflow-output OVF is also connected to an inverted input of the control-terminal C (with three inputs) of an AND-gate-group G4. The T-flip-flop F1 output Q is connected to the count enable CE of the counter, while the output $\overline{Q}$ is connected to the control-terminal C (with three inputs) of the said AND-gate-group G4. The outputs Q3, Q2, Q1 and Q0 of the counter is connected to the inputs of the said AND-gate-group G4. Also they are ORed by the OR gate G2 which output is connected to an input of an AND gate G3. The output pulses P1 to P7 (see FIG. 7) of a narow duty cycle clock Ck2 is distributed via a clock-bus CB2 to the reset-terminal RESET of the counter, the reset-terminal R of the RS-flip-flop F2, one of the three inputs of the control-terminal C of the AND-gate-group G4, one input of the AND gate G5 and one input of the AND gate G3. The outputs of the AND gates G3 and G5 and of the AND-gate-group G4 are connected to the inputs of a delay-element-group d1 which outputs are respectively connected to the address-buses A2, A0, the sign-bus SB, and the data-buses DB3, DB2, DB1, DB0 via the diodes D15, D14, D5, D4, D3, D2, D1 respectively. The pulses generated by the clock Ck1 is fed to the clock-terminal CP of the counter via the clock-bus CB1. The output of a manual-resetting button B is connected to the reset-terminal R of the T-flip-flop F1 via the reset-bus RB.

Normally, when the laser beams are impinging the sensors S1 and S3 (phototransistors), both outputs of these sensors together with the overflow-output OVF of the counter are low, that the OR gate G1 output is low. The T-flip-flop F1 is not triggered by the OR gate G1 and its output Q is normally low, that the counter is idle.

Now if the beam Br1 is swept first, its output is high that the monostable multivibrator M is set, that its output $\overline{Q}$ becomes low, and the AND gate G6 output is low that the RS-flip-flop F2 is not set. This condition represents one of the two possible opposing directions of cruising of the low-flying objects. The output $\overline{Q}$ of the monostable multivibrator M remains low for a preset short period, and as the subsequent momentarily high level of the sensor S3 is restricted to appear within this preset short period, this subsequent high level pulse also cannot set the RS-flip-flop F2. Pulses which come after the monostable multivibrator M has recovered its initial state are due to very slow moving objects or error that they are not taken into our consideration. In this case the T-flip-flop F1 may be held. It can be reset manually by pushing the button B. Also the overflow output OVF of the counter becomes high, this will automatically reset the T-flip-flop F1 and at the same time as it is connected to the inverted input of the control-terminal C of the AND-gate-group G4, the wrong count is prohibited from reaching the data-buses. Conversely, if the beam Br3 is swept first, it immediately sets the RS-flip-flop F2 before the output $\overline{Q}$ of the monostable multivibrator M can be triggered low by a subsequent high level pulse generated by the sensor S1. The set high level of the RS-flip-flop F2 output Q represents another (the opposite one of the above said one) direction of cruising of the flying object. On the other hand when the output of either the sensor S1 or the sensor S3 is high momentarily, the output of the OR gate G1 is high. The T-flip-flop F1 is triggered that its output Q is high and the counter begins to count the clock pulses fed to its clock-terminal CP. Meanwhile, the T-flip-flop F1 output $\overline{Q}$ is low, that the instantaneous count represented by the outputs Q3, Q2, Q1 and Q0 of the counter is prohibited to appear on the data-buses DB3, DB2, DB1 and DB0 respectively.

When the remaining beam is also swept later, the T-flip-flop F1 is reset, the counter stops counting, and hence the final count is proportional to the transient between when the two beams are swept. Also, the output $\overline{Q}$ of the T-flip-flop F1 has now returned to its original high level, and hence the final count is ready to be transferred.

When a high level pulse generated by the clock Ck2 reaches this rth stage, the states of the outputs Q of the RS-flip-flop F2 and Q3, Q2, Q1, Q0 of the counter are passed to the inputs of the delay-element-group d1 via the AND gate G5 and the AND-gate-group G4 respectively. If the count is non-zero, the OR gate G2 output is high, that the clock pulse itself can also reach one of the inputs of the delay-element-group d1, thus becoming the "transferred clock pulse".

For the rth stage, the count and the transferred clock pulse are delayed by $R\Delta t$ seconds before they can reach the appropriate buses, where r is an integer and $\Delta t$ is taken here a basic unit of time. The principle of this structure follows: as shown in the timing diagram FIG. 7, when one of the clock pulses p1, p2, p3, p4, p5, p6 and p7, say the clock pulse p3 generated by the clock Ck2 is travelling away from the clock Ck2 (far most end from the console) towards the console, its speed is the same as that of the released sign, count and the transferred clock pulse travelling in their relevant buses. The pulsations (i.e. the information) released from a certain stage reach the information buses (sign, count and address-buses) just $\Delta t$ seconds lagging the information released from its preceding stage regardless of the length of the multiples between stages. If the pulse width are less than $\Delta t$ seconds in duration as shown in FIG. 7, the pulses will not overlap each other, and hence the information pulses form an ordered sequence travelling towards the console which wave front is the pulses released from the first stage as shown in the four staged electronic network timing diagram FIG. 7.

Figure 7:
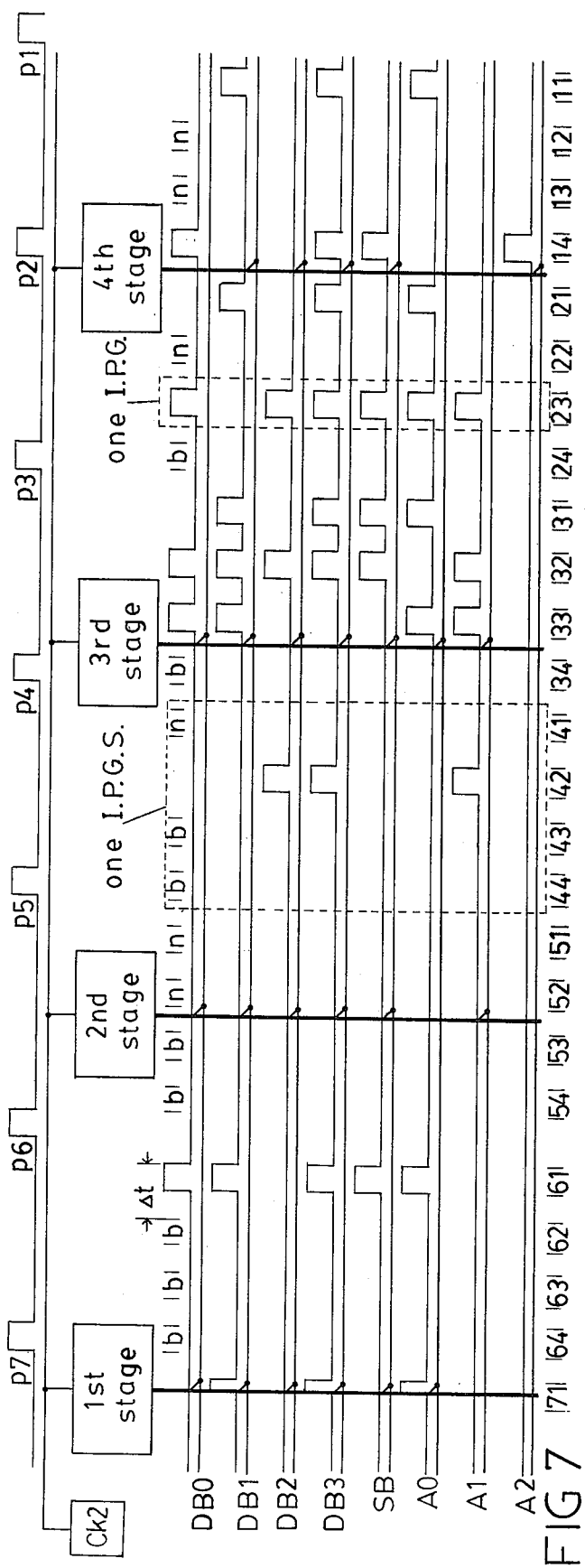
FIG. 7 is a timing diagram of the information pulse group sequences.

Further, again regardless of the length of the multiples between stages, the next clock pulse p4 appears at an optimized instant such that the first information-pulse-group I.P.G. released by this next clock pulse from the first stage of the electronic network will just follow the last information-pulse-group of its preceding information-pulse-group-sequence I.P.G.S. as that indicated in FIG. 7. The frequency of the clock pulses of the clock Ck2 can be designed to meet this optimization. In FIG. 7, the upper labels for the information-pulse-groups are defined as follows: "b" is a blank as the appropriate clock pulse generated by the clock Ck2 has not yet reach the relevant stage, while "n" is a null group and this appears when the counter is counting or when the appropriate beam-quadruplet is not interfered, or when the count is zero. For the low line of labels, "xy" shall mean the yth information-pulse-group of the xth information-pulse-group-sequence.

Via the jumpering diodes (the diodes D14 and D15 are shown in FIG. 1 as an arbitrary example), the transferred clock pulse produces the address of this rth stage. Now when the information reaches the console, the count is decoded by a read-only-memory ROM into velocity, while the sign and address are delayed by the delay-element-group d2 in compensation to the delay of the read-only-memory ROM. The diodes D6, D7, D8, D9, D10, D11, D12 and D13 in series with the buses is used to direct the information-pulse-groups to travel unidirectionally towards the console, otherwise the pulses travelling in the undesired direction and the reflected pulses of them at the far most open end of the buses can introduce errors in the formation. These diodes introduce voltage drops, intermediate amplifiers (g1, g2, g3, g4, g5, g6, g7 and g8) is used to compensate these losses.

For the determination of the vertical components of the velocities, the whole circuit can be repeated for the sensor-pair S2 and S4 except that the output of the OR gate in this new circuit corresponding to the OR gate G2 in the above described circuit is connected to one of the inputs (marked IN) of the AND gate G3 in the above described circuit and hence one AND gate G3 and one set of address buses together with the delay-element-group d2 are in common use. Further only one set of common clocks, clock and reset buses are essential.

TWO-DIMENSIONAL COORDINATION

To locate a flying object two-dimensionally, another system having the same features (but may have different capacity of beam-quadruplets and circuits etc.) is used. But, now, the orientation of the set of laser beam-quadruplets of this new system is arranged orthogonal to the above said set of laser beam-quadruplets, and both sets of beam-quadruplets lie on the same horizontal plane. Thus this pattern forms an optical matrix which rows and columns are the orthogonally intersecting sets of laser beam-quadruplets, and which matrix-elements are the cross-points of these beam-quadruplets. So, if the columns and rows are identified, the two-dimensional (discrete) locations of the flying objects can be located and their associated velocities determined.

THREE-DIMENSIONAL COORDINATION

If a number of layers of the above said two-dimensional coordinating system is cascaded vertically, and with the said horizontal planes of laser beam-quadruplets spaced vertically according to the sensitivities of the systems (about 15 to 40 meters apart) a three-dimensional coordinating system is formed. Practically, this is a non-substantial cubic matrix mesh.

I am aware that details of construction of this invention may be varied and I, therefore, do not purpose limiting the patent hereon granted other than as indicated by the appended claims.

I claim:

1. A set of one or more layers of electro-optical systems for locating and measuring the velocities of low-flying objects approaching or intruding the surveillance region of said set of electro-optical systems, each said electro-optical system comprising two orthogonally oriented sequences of prism-complexes, each said prism-complex made of two right-angled-isosceles-prisms coupled at hypotenuse planes thereof by a thin film having a refractive index deviated from that of said prisms and an adjusted reflection coefficient, each said prism-complex accompanied remotely horizontally side-by-side by a light-sensor-quadruplet, thereby each of said two orthogonally oriented prism-complex sequences is accompanied by a dual-in-line light-sensor-quadruplet sequence, each said light-sensor-quadruplet being an erect rhombic configuration of four light sensors, each said prism-complex sequence accompanied by an erect rhombic configuration of four lasers emitting therefrom four parallel horizontal laser beams forming a beam-quadruplet having the axis thereof normal to the plane of said erect rhombic configuration of said four lasers, said laser beams being intercepted successively by said sequence of prism-complexes whereby small portions of said laser energy are reflected by said thin films to impinge corresponding said light sensors thereof, said laser beams being sufficiently fine that normal impingements thereof at said light sensors are interrupted when said laser beams are sufficiently deflected aerodynamically by said low-flying objects, thereby producing electrical output signals, parallel pairs of planar reflecting means for directing said laser beams to follow desired ray paths whereinto are inserted said reflecting means, thereby preserving inter-path-spans within each said beam-quadruplet, rectangular sectioned tubes having lateral apertures as outlets for said reflected laser beams and enclosing said prism-complexes and said planar reflecting means thereby shielding said beam-quadruplets, a monostable multivibrator having the input thereof connected to a first light sensor of the horizontal pair of any one of said light-sensor-quadruplets responsive to the electrical output signal therefrom, and a first AND gate having one input thereof connected to the inverted output $\overline{Q}$ of said monostable multivibrator and another input thereof to a second light sensor of the same pair of said first light sensor, thereby producing electrical output signals dependent of the orders of arrivals of electrical signals from said first and second light sensors, a RS-flip-flop having a set input S thereof connected to the output of said first AND gate thereby registering the electrical output signals therefrom, thereby registering the moving directions of a said low-flying object by the output Q thereof, a first OR gate having one input thereof connected to said first light sensor and another input thereof connected to said second light sensor responsive to the electrical output signals therefrom producing an electrical output signal, a T-flip-flop having a trigger input T thereof connected to the output of said first OR gate responsive to the electrical output signal therefrom producing a high level at the output Q thereof for a transient period between the arrivals of said electrical output signals from said light sensors, and a counter having a clock pulse input CP thereof connected to a first clock bus and fed by clock pulses therefrom, said counter further having a count-enable input CE thereof connected to the output Q of said T-flip-flop responsive to the high level thereof, thereby counting the clock pulses fed thereto a period inversely proportional to the velocity of a said low-flying object, said counter further having an overflow output OVF thereof connected to an input of said first OR gate to produce a high level at the output thereof to reset said T-flip-flop whenever there is an overflow of said counter, thereby ignoring sufficiently slow low-flying objects, an AND gate group having inputs thereof connected to the outputs of said counter, a first control input thereof connected to the overflow output of said counter, a second control input thereof connected to the inverted output $\overline{Q}$ of said T-flip-flop, thereby the Count appearing at the outputs of said counter is ready to be clocked to appear at the outputs thereof whenever there is no overflow of said counter and said counter is not counting, a second AND gate having a first input connected to the output Q of said RS-flip-flop to gate the transfer of the sign registered thereat, a second OR gate having inputs thereof connected to all outputs of said counter, thereby producing a high level at the output thereof whenever the Count of said counter is non-zero, a third AND gate having an input thereof connected to the output of said second OR gate responsive to the high level signal therefrom to gate the transfer of a clock pulse fed from a second clock bus to a second input thereof, thereby having the possibility of producing a transferred pulse, a first delay-element-group having inputs thereof connected to the outputs of said AND gate group and said second and third AND gates, said first delay-element-group further having outputs thereof respectively coupled to the data buses and sign bus and jumpered onto the address buses, thereby transferring thereto said Count, sign and transferred pulse with a delay upon the arrival of a clock pulse fed from said second clock bus, said delay being present at an integer units of time base, said integer being the counted-towards-console numbering of the particular stage of above-described electronic circuit, a first plurality of diodes coupled between said outputs of said first delay-element-group and said data buses, sign bus and address buses to perform an OR function with respect thereto, a second plurality of diodes cascaded into said data buses, sign bus and address buses facilitating unidirectional information flow towards said console, a plurality of amplifiers cascaded into said data buses, sign bus and address buses compensating transmission line losses, a plurality of repeated above-described apparatuses and couplings in connection with the remaining horizontal pairs of light sensors of said light-sensor-quadruplet sequence, and also a plurality of identical apparatuses and couplings described afore in connection with all said vertical pairs of light sensors of said light-sensor-quadruplet sequences, the outputs of the OR gates corresponding to said second OR gate being coupled to the inputs of AND gates in said repeated apparatuses for horizontal light sensor pairs corresponding to a second input IN of said third AND gate, said first clock bus connected to the clock pulse inputs of said counters of said plurality of apparatuses in connection with both said horizontal and vertical pairs of light sensors transmitting thereto clock pulses of a first frequency, a first clock connected to said first clock bus feeding thereto clock pulses of said first frequency, said second clock bus connected to a second input of said second AND gate, a third control input of said AND gate group and a third input of said third AND gate transmitting thereto clock pulses of a second frequency lower said first frequency, thereby releasing said Sign, Count and transferred pulse to reach said sign bus, data buses and address buses synchronously forming a travelling information-pulse-group, said second clock bus further connected identically to said plurality of apparatuses, thereby the information thereof being released stage by stage consecutively starting from the stage far most from said console forming an ordered information-pulse-group-sequence having the wave front thereof being the information-pulse-group generated by the stage far most from said console, duty-cycle pulse width of said clock pulses of said second frequency being sufficiently less than said time base of said first delay-element-group ensuring non-overlapping of said information-pulse-group, said second frequency tuned to an optimum facilitating non-overlapping and compactness of a train of said information-pulse-group-sequences generated by a train of said clock pulses of said second frequency, said second clock bus further coupled to the reset inputs R of the RS-flip-flops of said plurality of apparatuses and to the RESET inputs of said counters facilitating recurrent auto-reset thereto, a second clock connected to said clock bus feeding thereto clock pulses of said second frequency, a reset bus connected to the reset inputs of the T-flip-flops of said plurality of apparatuses for clearing the outputs thereof whenever there are errors, a reset button connected to said reset bus for manual operations, said data buses coupling the Count part of said outputs of said first delay-element-groups of said plurality of apparatuses to the inputs of a read-only-memory in said console, said read-only-memory for decoding said Counts into Velocities appearing at the outputs thereof, said sign bus coupling the Sign outputs of said first delay-element-groups to one input of a second delay-element-group in said console, said address buses coupling the transferred-pulse-outputs of said first delay-element-groups to the remaining inputs of said second delay-element-group, said second delay-element-group for compensating the timing of said signs and addresses to appear at the outputs thereof in parallel with said Velocities.

* * * * *